US012709696B2

(12) United States Patent
Li et al.

(10) Patent No.: US 12,709,696 B2
(45) Date of Patent: Aug. 18, 2026

(54) KETONE FUNCTIONALIZED POLYMERS, METHODS OF MAKING KETONE FUNCTIONALIZED POLYMERS, AND COMPOSITIONS INCLUDING THE SAME

(71) Applicant: Ennis-Flint, Inc., Greensboro, NC (US)

(72) Inventors: Haibo Li, Greensboro, NC (US); Matthew Swenson, Greensboro, NC (US)

(73) Assignee: Ennis-Flint, Inc., Greensboro, NC (US)

( * ) Notice: Subject to any disclaimer, the term of this patent is extended or adjusted under 35 U.S.C. 154(b) by 811 days.

(21) Appl. No.: 17/999,242

(22) PCT Filed: May 20, 2021

(86) PCT No.: PCT/US2021/033324
§ 371 (c)(1),
(2) Date: Nov. 18, 2022

(87) PCT Pub. No.: WO2021/236883
PCT Pub. Date: Nov. 25, 2021

(65) Prior Publication Data
US 2023/0227687 A1 Jul. 20, 2023

Related U.S. Application Data

(60) Provisional application No. 63/027,568, filed on May 20, 2020.

(51) Int. Cl.

| | |
|---|---|
| ***C09D 133/14*** | (2006.01) |
| ***C08F 220/14*** | (2006.01) |
| ***C08F 220/34*** | (2006.01) |
| ***C08L 33/14*** | (2006.01) |

(52) U.S. Cl.
CPC .......... *C09D 133/14* (2013.01); *C08F 220/14* (2013.01); *C08F 220/34* (2013.01); *C08L 33/14* (2013.01)

(58) Field of Classification Search
CPC .................................................... C08F 220/34
See application file for complete search history.

(56) References Cited

U.S. PATENT DOCUMENTS

| | | | |
|---|---|---|---|
| 5,661,212 | A | 8/1997 | Lear et al. |
| 5,969,046 | A | 10/1999 | Schindler et al. |
| 2003/0134949 | A1 | 7/2003 | Brown |

FOREIGN PATENT DOCUMENTS

| | | | |
|---|---|---|---|
| CN | 102504090 | A | 6/2012 |
| CN | 102604504 | A | 7/2012 |
| CN | 105603783 | A | 5/2016 |
| CN | 106283742 | A | 1/2017 |
| CN | 106560494 | A | 4/2017 |
| EP | 0360152 | A2 | 3/1990 |
| EP | 0326723 | B1 | 3/1993 |
| JP | 2010-084119 | A | 4/2010 |
| JP | 5611531 | B2 | 10/2014 |
| WO | 2018097279 | A1 | 5/2018 |

OTHER PUBLICATIONS

Machine translation of JP2010084119 (Year: 2010).*
International Search Report and Written Opinion received for PCT Application Serial No. PCT/US2021/033324 dated Sep. 17, 2021, 9 pages.

* cited by examiner

*Primary Examiner* — Wenwen Cai

(57) ABSTRACT

A ketone-containing polymer can provide for a paint having increased scrub resistance and decreased changes in viscosity, while maintaining quick dry times. In particular, the polymers may be used in compositions for traffic markings and industrial coatings.

14 Claims, No Drawings

KETONE FUNCTIONALIZED POLYMERS, METHODS OF MAKING KETONE FUNCTIONALIZED POLYMERS, AND COMPOSITIONS INCLUDING THE SAME

CROSS-REFERENCE TO RELATED APPLICATIONS

This application claims priority to U.S. Provisional Application No. 63/027,568, filed May 20, 2020, which is incorporated herein by reference in its entirety for all purposes.

FIELD

Described herein are polymers, and polymers used in paint or coating compositions. In some aspects the compositions described herein can be useful for roadway markings.

BACKGROUND

Paint or coating compositions can have a wide range of applications. In applications such as traffic markings and industrial coatings, durability and drying time may be considerations when selecting a paint or coating composition.

Polyfunctional amine (PFA) in paint or coating compositions, such as waterborne paints, have been used to impart better dry time and/or better water resistance. However, these paint or coating compositions can exhibit limited paint stability and low scrub resistance. Furthermore, known paint or coating compositions with suitable stability and/or scrub resistance may exhibit undesirably high dry times. The combination of stability, scrub resistance, and suitable dry time is particularly useful in certain applications, such as in fast dry waterborne coating, waterborne adhesives and sealants.

SUMMARY

The present disclosure provides a polymer according to Formula 1:

Formula 1

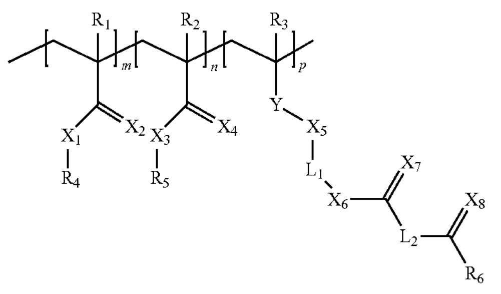

wherein each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_5$ is —H or $C_1$-$C_6$ alkyl; $R_6$ is substituted or unsubstituted $C_1$-$C_6$ alkyl; each of $X_1$, $X_3$, $X_5$, and $X_6$ is independently S, O, or N; each of $X_2$, $X_4$, $X_7$, and $X_5$ is independently S or O; Y is $CH_2$, CS, or CO; and each of $L_1$ and $L_2$ is independently substituted or unsubstituted $C_1$-$C_6$ alkyl.

The present disclosure also provides a polymer formed from the formed by reacting a mixture comprising the following monomers:

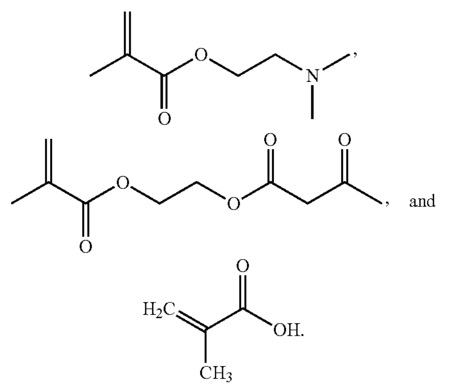

, and

The present disclosure also provides a polymer according to Formula 2:

Formula 2

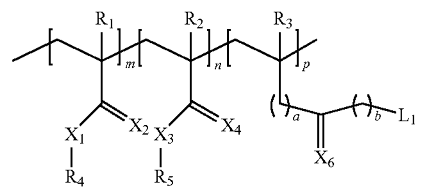

wherein each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_4$ is —H or $C_1$-$C_6$ alkyl; each of $X_1$ and $X_3$ is independently S, O, or N; each of $X_2$, $X_4$, and $X_6$, is independently S or O; each of a and b is independently a number from 0 to 4; and $L_1$ is —H or substituted or unsubstituted $C_1$-$C_6$ alkyl.

DETAILED DESCRIPTION

Paints and coating compositions with high stability and good scrub resistance without the loss of advantages dry time may be achieved with the polymers described herein. Polymers having a structure according to Formula 1 are disclosed herein:

Formula 1

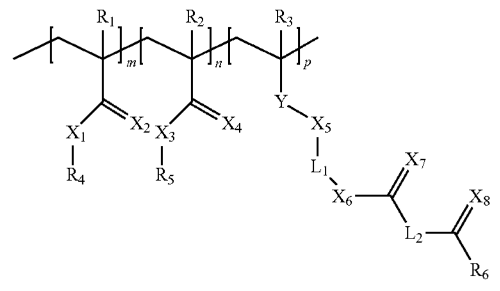

wherein each of m, n, and p is independently a number from 0.5 to 500; each of $R_1$, $R_2$, and $R_3$ is independently H or $C_1$-$C_4$ alkyl; $R_4$ is an amine-substituted $C_1$-$C_6$ alkyl; $R_5$ is H or $C_1$-$C_6$ alkyl; $R_6$ is substituted or unsubstituted $C_1$-$C_6$ alkyl; each of $X_1$, $X_3$, $X_5$, and $X_6$ is independently S, O, or N; each of $X_2$, $X_4$, $X_7$, and $X_8$ is independently S or O; Y is $CH_2$, CO, or CS; and each of $L_1$ and $L_2$ is independently substituted or unsubstituted $C_1$-$C_6$ alkyl.

Polymers may be formed from the reaction mixture comprising the following monomers:

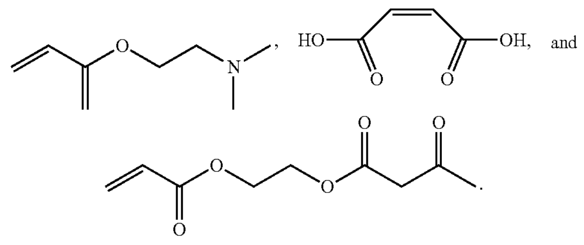

Polymers may have a structure according to Formula 1:

Formula 1

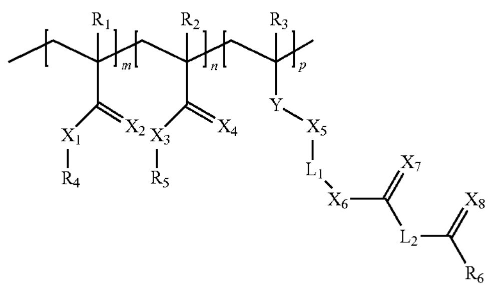

where each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_5$ is —H or $C_1$-$C_6$ alkyl; $R_6$ is substituted or unsubstituted $C_1$-$C_6$ alkyl; each of $X_1$, $X_3$, $X_5$, and $X_6$ is independently S, O, or N; each of $X_2$, $X_4$. $X_7$, and $X_8$ is independently S or O; Y is $CH_2$, CO, or CS; and each of $L_1$ and $L_2$ is independently substituted or unsubstituted $C_1$-$C_6$ alkyl.

The polymers can be referred to as Ketone-Polyfunctional Amine ("Ketone-PFA") polymers.

$R_4$ may be selected from the group consisting of $—CH_2CH_2NH_2$, $—CH_2CH_2N(CH_3)_2$, and $—CH_2CH_2N(CH_2CH_3)_2$.

$L_1$ and $L_2$ may be independently selected from the group consisting of $—CH_2—$; $—CH_2CH_2—$; and $—CH_2CH_2CH_2—$. Optionally, $L_1$ may be $—CH_2CH_2—$.

$R_6$ may be $—CH_3$. Each of $X_1$ to $X_8$ may be O, and Y may be CO. Each of $R_1$-$R_3$ may be $—CH_3$.

The polymer may have a structure according to Formula 1x:

Formula 1x

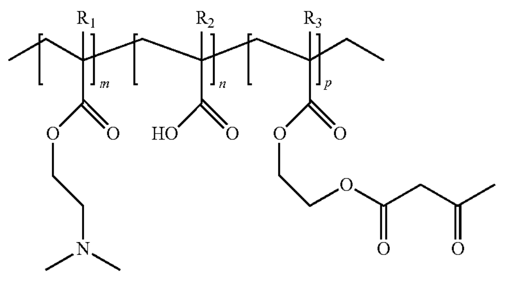

wherein each of $R_1$, $R_2$, and $R_3$ is independently H, $CH_3$, or $CH_2CH_3$. In the polymer, m may be from 80 to 200, n may be 10 to 20, and p may be 0.5 to 4.

The polymer may have a structure according to Formula 2:

Formula 2

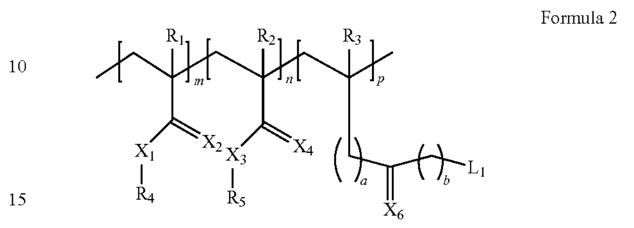

where each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_5$ is —H or $C_1$-$C_6$ alkyl; each of $X_1$ and $X_3$ is independently S, O, or N; each of $X_2$, $X_4$, and $X_6$, is independently S or O; each of a and b is independently a number from 0 to 4; and $L_1$ is —H or substituted or unsubstituted $C_1$-$C_6$ alkyl.

The polymers can be derived from acrylate, methacrylate, or ethacrylate monomers, or a mixture thereof.

The polymers can be random copolymers. The subscripts m, n, and p represent the average number of specific types of monomer units incorporated in the copolymer as repeat units.

Numbers m, n, and p represent the average number of the designated repeat units in the polymer chain. In cases where m, n, or p has a value of less than one, then a fraction of the polymer chains contain the designated repeat unit. The value of m can be from 50 to 500, from 60 to 400, from 80 to 200, from 90 to 180, or from 100 to 150. The value of n can be from 5 to 50, from 6 to 45, from 7 to 40, from 8 to 30, from 8 to 20, or from 10 to 15. The value of p can be from 0.5 to 4, from 0.6 to 3.5, from 0.7 to 3, from 0.8 to 2.5, or from 1 to 2. The ratio of m:p can be any number between 20 and 400. The ratio of n:p can be any number between 2 and 40. The ratio of m:n:p can be about 50:5:1 or about 150:20:1.

The polymers can be formed from a reaction mixture comprising certain monomers. In cases where a ketone-containing monomer is used, the resulting polymer is called a Ketone-containing polymer. If an amine-containing monomer is used in addition to the ketone-containing monomer, the resulting polymer is called a Ketone-Amine polymer. More specifically, if polyfunctional amine-containing monomer is used in addition to the ketone-containing monomer, the resulting polymer is called a Ketone-PFA polymer.

The reaction mixture may comprise a ketone-containing monomer and an amino-containing monomer. The ketone-containing monomer may comprise more than one ketone moiety per monomer. The ketone-containing monomer can comprise 2, 3, 4, 5 or 6 ketone moieties per monomer.

The presence of the amino-containing monomer may improve the performance characteristics of the PFA as well as the compositions formed therefrom. In certain environments (e.g., at appropriate pH, as described below), the amino groups along the PFA may be positively charged. The positively charged amino groups may attract other components of the compositions (e.g., latex particles), facilitating film formation.

Any ketone-containing monomer can be used for the polymer. A ketone-containing monomer such as 2-(Methacryloyloxy)ethyl acetoacetate (AAEM), Diacetone acrylamide (DAAM), allyl acetoacetate (AAA), 2-(Acryloyloxy) ethyl acetoacetate (AAEA), methyl vinyl ketone (MVK), ethyl vinyl ketone (EVK), allyl acetone, acrolein, and/or methacrolein, may be used. Ketone-containing monomers based on acrylic acid, methyl acrylate, ethyl acrylate, propyl acrylate, and butyl acrylate monomers may be used.

The amine-containing monomer may comprise one or more amino moieties per monomer. The amino moieties can be primary amine groups, secondary amine groups, or tertiary amine groups. In some examples, the amine-containing monomer may comprise more than one amino moiety per monomer. The amine-containing monomer may comprise 2, 3, 4, 5 or 6 amino moieties per monomer. In this case, each amino moiety of the amine-containing monomer may independently be a primary amine group, a secondary amine group, or a tertiary amine group.

Any amine-containing monomer can be used. Amine-containing monomers such as 2-(Dimethylamino)ethyl methacrylate (DMAEMA), 2-(Dimethylamino)ethyl acrylate (DMAEA), 3-(Dimethylamino)propyl acrylate (DMAPA), 2-(Diethylamino)ethyl acrylate (DEAEA), 2-(Diethylamino)ethyl methacrylate (DEAEMA), 2-(Diisopropylamino)ethyl methacrylate (DIAEMA), N-3-(Dimethylamino)propylmethacrylamide (N-DMAPMA), and 2-N-Morpholinoethyl methacrylate (MEMA) may be used.

Additional monomers may be included in the reaction mixture. Particular examples include maleic acid (MA), maleic anhydride (MAHD), fumaric acid (FA), and methacrylic acid (MAA). MAHD and/or FA may be substituted for MA, and the reaction mixture may be essentially free of MA.

The polymers may be formed from a reaction mixture comprising the following monomers:

(DMAEMA)

(MA)

(AAEM)

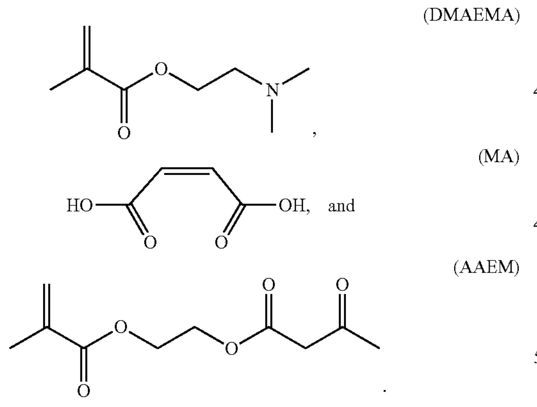

The polymers may be formed from a reaction mixture comprising the following monomers:

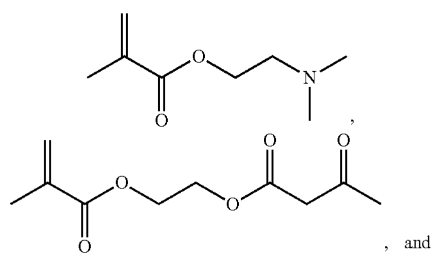

, and

-continued

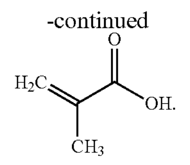

The reaction mixture may further comprise one or more of the following monomers:

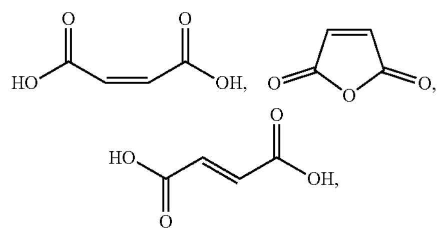

or combinations thereof.

Disclosed herein are methods of making ketone functionalized polymers. A polymerization reaction mixture may further comprise one or both of the following monomers:

(MMA)

(FA)

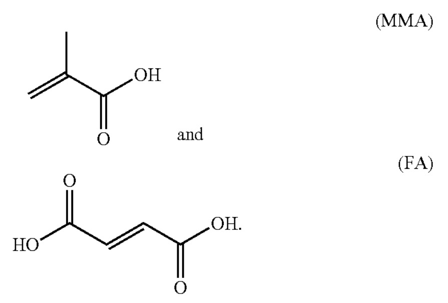

A solution comprising water and maleic anhydride can be prepared in a vessel. Fumaric acid and/or maleic acid may be substituted for some or all of the maleic anhydride. The prepared solution may comprise an aqueous solution of maleic anhydride, fumaric acid and/or maleic acid in an amount of from 0.1 wt. % to 10 wt. % based on the total weight of the prepared solution. The prepared solution may comprise an aqueous solution of maleic anhydride, fumaric acid and/or maleic acid in an amount of from 0.1 wt. % to 8 wt. %, from 0.1 wt. % to 5 wt. %, from 0.1 wt. % to 3 wt. %, from 0.5 wt. % to 8 wt. %, from 0.5 wt. % to 5 wt. %, from 0.5 wt. % to 3 wt. %, from 1 wt. % to 8 wt. %, from 1 wt. % to 5 wt. %, or from 1 wt. % to 3 wt. %.

A monomer suspension can formed by placing a ketone-containing monomer and an amine-containing monomer in water. The monomer suspension may comprise additional monomers, such as MMA. The monomer solution may be added to the prepared solution.

The monomer solution may comprise a monomer suspension of DMAEMA, AAEM, and/or MAA. DMAEMA may be present from 60 wt. % to 98 wt. % in the monomer suspension. DMAEMA may be present in the monomer suspension in an amount from 70 wt. % to 95 wt. % of the monomer suspension, e.g., from 75 wt. % to 90 wt. %. AAEM may be present from 0.2 wt. % to 5 wt. % in the monomer solution. AAEM may be present in the monomer suspension in an amount of from 0.5 wt. % to 4 wt. % of the monomer solution, e.g., from 0.75 wt. % to 3 wt. % or from 1 wt. % to 3 wt. % of the monomer solution. In cases where MAA is present, it may be present in the monomer solution in an amount of up to 5 wt. % of the monomer solution. e.g., up to 10 wt. % or up to 15 wt. %. Maleic acid, which may be charged to reactor, may be mixed in the monomer solution as well.

An initiator solution (e.g., a redox initiator) may be added to the vessel. Multiple redox initiator solutions may be added to the vessel. The initiator solution and the redox initiator may be added to the vessel at the same period of time, or at a different period of time. The reaction mixture may comprise less than 20 vol. % of the initiator solution.

The reaction can be conducted at a temperature of from 1° C. to 90° C. The reaction may begin at ambient conditions. As used herein, "ambient conditions" refers to room temperature, e.g., from 20° C. to 30° C. The reaction may be exothermic in nature.

The reaction can be initiated by a thermal free radical initiator. Any known free radical initiator may be used. The free radical initiator may be selected from the group consisting of ammonium persulfate (APS), azobisisobutyronitrile (AIBN), benzoyl peroxide, acetyl peroxide, and t-butyl peracetate. The free radical initiator may be ammonium persulfate. The free radical initiator may be azobisisobutyronitrile.

The reaction can be initiated by a free radical initiator created reducing-oxidizing (red-ox) initiation. The reaction can be initiated by a reducing-oxidizing pair of initiators comprising an oxidizing agent and a reducing agent. Any known reducing-oxidizing pair of initiators may be used. Non-limiting examples of the oxidizing agent may include hydrogen peroxide, tert-butyl hydroperoxide (tBHP), ammonium persulfate (APS), sodium persulfate (SPS) and potassium persulfate (PPS). Non-limiting examples of the reducing agent may include a sulfinic acid derivative formaldehyde free reducing agent such as Bruggolite FF6M (available from Briggemann), disodium hydroxysulfinoacetate (Bruggolite FF7), sodium salt of an organic sulfinic acid derivative such as Bruggolite E28 (available from Bruggemann), sodium formaldehyde sulfoxylate (Bruggolite E01), a stabilized solution of sodium formaldehyde sulfoxylate (Bruggolite L40), Bruggolite TP1651 (available from Brügge-mann), ascorbic acid, sodium formaldehyde sulfoxylate (SFS), sodium bisulfite, and sodium metabisulfite (SMBS).

The oxidizing agent may be present in an aqueous oxidizing solution in an amount of from 0.2 to 5 wt. %, based on total monomer weight. The reducing agent may be present in an aqueous reducing solution in an amount of from 0.2 to 5 wt. %, based on total monomer weight. The weight ratio of the oxidizing agent to the reducing agent may be from 0.5:1 to 2:1.

In another aspect, the polymers disclosed herein may be used as additives in coatings, for example, paint.

It will be recognized by one of ordinary skill in the art that the latex formulations described herein may be used as water-borne paints, or that the latex particles might be dried or otherwise purified and used in low- or non-aqueous coating applications. The coating compositions can comprise the polymers disclosed herein and an amine-containing compound. The amine-containing compound may comprise an amine-containing polymer. The amine-containing compound may comprise a silyl amine.

The polymers described herein may be used as performance-enhancing additives in coating compositions, including water-borne paints for traffic marking. Ketone-PFA polymers can be used as additives in an amount of less than 2 wt. %, less than 1.5 wt. %, less than 1 wt. %, less than 0.9 wt. %, or less than 0.5 wt. %, based on the total weight of the water-borne paints. Ketone-PFA polymers can be used as additives in an amount of from 0.1 to 2 wt. %, from 0.25 to 1.5 wt. %, from 0.5 to 1.5 wt. %, or from 0.5 to 1 wt. %, based on the total weight of the water-borne paints.

The polymers described herein may be used as performance-enhancing additives in high-build coating compositions. High-build coating compositions comprising Ketone-PFA polymers can be applied at a thickness of at least 5 mils, e.g., at least 10 mils, at least 15 mils, at least 20 mils, at least 25 mils, at least 30 wet mils, at least 40 mils, or at least 50 mils.

The coating compositions comprising Ketone-PFA polymers may further comprise an amine-containing compound. The amine-containing compound may comprises an amine-containing polymer. The amine-containing compound may comprise a silyl amine. The amine functionality of a silyl amine additive can react with the ketone functionality in the Ketone-PFA polymer additive to cross-link and strengthen the paint formulation.

Organic compounds carrying a primary or secondary amino group and silyl group that is categorized as a "silyl amine" can be used with the compositions provided herein. Optionally, the silyl amines can be selected from the group consisting of N-[3-(Trimethoxysilyl)propyl]ethylenediamine, N1-(3-Trimethoxysilylpropyl)diethylenetriamine, (3-Aminopropyl)trimethoxysilane, (3-Aminopropyl)triethoxysilane, 3-(Ethoxydimethylsilyl)propylamine, and N-[3-(Trimethoxysilyl)propyl]ethylenediamine. The silyl amine may be aminoethylaminopropyl trimethoxysilane.

Polymeric or oligomeric ethylene imines serving as silyl amine alternatives may be used instead of, or in addition to, the silyl amines listed above. A list of suitable polymeric and oligomeric ethylene imines include, but are not limited to, linear poly(ethylene imine) (PEI), dendritic or branched poly(ethylene imine) (PEI), low molecular weight ethylene diamine (EDA), diethylene triamine (DETA), triethylene tetraamine (TETA), tetraethylene pentamine (TEPA), and pentaethylene hexamine (PEHA).

The silyl amines may be used as additives in an amount of less than 1 wt. %, less than 0.5 wt. %, less than 0.4 wt. %, less than 0.3 wt. %, less than 0.2 wt. %, or less than 0.1 wt. %, based on the total dry weight of the water-borne paints. Dry weight refers to the weight of the solid components in the water-borne paint. The silyl amines may be used as additives in an amount of from 0.01 to 0.5 wt. %, from 0.005 to 0.5 wt. %, from 0.05 to 0.5 wt. %, or from 0.000001 to 0.5 wt. %, based on the total weight of the water-borne paints. Optionally, no silyl amine additive may be present.

Known latex additives may be present in some coating compositions. Examples may include, but are not limited to dispersants, nonionic surfactants, defoamers, viscosity modifiers, water, titanium dioxide ($TiO_2$), calcium carbonate ($CaCO_3$), methanol (MeOH), coalescing solvents, and float solvents.

Ketone-PFA polymers can be used in a coating composition comprising a latex paint that is anionically stabilized, such as the latex described in Example 3, below.

The consistency of paints and coatings may be measured using a Stormer-type viscometer to determine Krebs Unit (KU) viscosity according to ASTM D562-10 (2018), "Standard Test Method for Consistency of Paints Measuring Krebs Unit (KU) Viscosity Using a Stormer-Type Viscometer." Using ASTM D562-10, the initial KU and delta KU can be measured. Initial KU refers to viscosity of fresh made paints, and delta KU refers to viscosity of paints being set at 63° C. for one week The coating composition may have a delta KU (Krebs Unit) value of less than 15 KU, less than 14 KU, less than 13 KU, less than 12 KU, less than 11 KU, less than 10 KU, less than 9 KU, less than 8 KU, less than 7 KU, or less than 6 KU.

Dry time of the paints and coatings may be determined according to ASTM D711-20 (2015), "Standard Test Method for No-Pick-Up Time of Traffic Paint." The coating compositions may have a dry time of less than 10 minutes, less than 9 minutes, less than 8 minutes, less than 7 minutes, less than 6 minutes, less than 5 minutes, or less than 4 minutes.

Scrub Resistance of the paints and coatings may be determined according to ASTM D2486-00 (2000), "Standard Test Methods for Scrub Resistance of Wall Paints." The coating compositions may have a scrub resistance of greater than or equal to 100% relative to a control sample of a conventional paint. The coating composition may have a scrub resistance of greater than or equal to 105%, greater than or equal to 110%, greater than or equal to 115%, greater than or equal to 120%, greater than or equal to 125%, greater than or equal to 130%, greater than or equal to 135%, or greater than or equal to 140% relative to the control.

As used herein, the terms alkyl, alkenyl, and alkynyl include straight- and branched-chain monovalent substituents. Examples include methyl, ethyl, isobutyl, 3-butynyl, and the like.

The term alkoxy as used herein is an alkyl group bound through a single, terminal ether linkage. The term aryloxy as used herein is an aryl group bound through a single, terminal ether linkage. Likewise, the terms alkenyloxy, alkynyloxy, heteroalkyloxy, heteroalkenyloxy, heteroalkynyloxy, heteroaryloxy, cycloalkyloxy, and heterocycloalkyloxy as used herein are an alkenyloxy, alkynyloxy, heteroalkyloxy, heteroalkenyloxy, heteroalkynyloxy, heteroaryloxy, cycloalkyloxy, and heterocycloalkyloxy group, respectively, bound through a single, terminal ether linkage.

The term hydroxy as used herein is represented by the formula —OH.

The terms amine or amino as used herein are represented by the formula $—NZ^1Z^2$, where $Z^1$ and $Z^2$ can each be substitution group as described herein, such as hydrogen, an alkyl, halogenated alkyl, alkenyl, alkynyl, aryl, heteroaryl, cycloalkyl, cycloalkenyl, heterocycloalkyl, or heterocycloalkenyl group described above.

The alkoxy, aryloxy, amino, alkyl, alkenyl, alkynyl, aryl, heteroalkyl, heteroalkenyl, heteroalkynyl, heteroaryl, cycloalkyl, or heterocycloalkyl molecules used herein can be substituted or unsubstituted. As used herein, the term substituted includes the addition of an alkoxy, aryloxy, amino, alkyl, alkenyl, alkynyl, aryl, heteroalkyl, heteroalkenyl, heteroalkynyl, heteroaryl, cycloalkyl, or heterocycloalkyl group to a position attached to the main chain of the alkoxy, aryloxy, amino, alkyl, alkenyl, alkynyl, aryl, heteroalkyl, heteroalkenyl, heteroalkynyl, heteroaryl, cycloalkyl, or heterocycloalkyl, e.g., the replacement of a hydrogen by one of these molecules. Examples of substitution groups include, but are not limited to, hydroxy, halogen (e.g., F, Br, Cl, or I), and carboxyl groups. Conversely, as used herein, the term unsubstituted indicates the alkoxy, aryloxy, amino, alkyl, alkenyl, alkynyl, aryl, heteroalkyl, heteroalkenyl, heteroalkynyl, heteroaryl, cycloalkyl, or heterocycloalkyl has a full complement of hydrogens, i.e., commensurate with its saturation level, with no substitutions, e.g., linear decane $(—(CH_2)_9—CH_3)$.

As used herein, unless otherwise expressly specified, all numbers such as those expressing values, ranges, amounts or percentages may be read as if prefaced by the word "about", even if the term does not expressly appear. Any numerical range recited herein is intended to include all subranges subsumed therein. Plural encompasses singular and vice versa. For example, while the invention has been described in terms of "a" polymer according to Formula 1, a mixture of such polymers can be used. Also, as used herein, the term "polymer" is meant to refer to prepolymers, oligomers and both homopolymers and copolymers; the prefix "poly" refers to two or more. When ranges are given, any endpoints of those ranges and/or numbers within those ranges can be combined within the scope of the present invention. Including and like terms means "including but not limited to".

The word "comprising" and forms of the word "comprising" as used in this description and in the claims does not limit the invention claimed to exclude any variants or additions.

Although the invention has been described in terms of "comprising", "consisting essentially of" or "consisting of" are also within the scope of the present invention. For example while the invention has been described in terms of a coating composition comprising a polymer (or polymers) described herein and an amine-containing compound, a coating composition consisting essentially of and/or consisting of the polymer (or polymers) and the amine-containing compound is also within the present scope. In this context, "consisting essentially of" means that any additional coating components will not materially affect the viscosity, dry time, and/or scrub resistance of the coating.

EXAMPLES

Notwithstanding that the numerical ranges and parameters setting forth the broad scope of the invention are approximations, numerical values set forth in the specific examples are reported as precisely as possible. Any numerical value, however, inherently contains certain errors necessarily resulting from the standard variation found in their respective testing measurements.

Example 1: Preparation of Ketone-PFA Polymer

An exemplary Ketone-PFA polymer was prepared according to the following method. Table 1 provides the amounts of each component used to form an exemplary Ketone-PFA polymer.

TABLE 1

Reagents for Preparation of Ketone-PFA Polymer

| Solution | Material | Weight (g) | CAS |
|---|---|---|---|
| Vessel | Water | 469.3 | 7732-18-5 |
| | Maleic acid | 20 | 110-16-7 |
| Monomer | Amino (meth)acrylic monomer (DMAEMA) | 203.1 | 2867-47-2 |
| | Ketone Functional Monomer (AAEM) | 4.1 | 21282-97-3 |
| | (Meth)acrylic acid (MAA) | 25 | 79-41-4 |
| | Water | 5.4 | 7732-18-5 |
| Oxidizer | tert-Butyl hydroperoxide solution (70%) (tBHP) | 2.5 | 75-91-2 |
| | Water | 48.8 | 7732-18-5 |
| Reducer | Bruggolite FF6 | 3.6 | Mixture |
| | Water | 48.8 | 7732-18-5 |

Bruggolite FF6 is commercially available from Brüggemann (Heil-bronn, Germany).

Preparation Steps:

Maleic acid and water were charged to a vessel.

In a monomer vessel, 2-(Dimethylamino)ethyl methacrylate (DMAEMA), 2-(Methacryloyloxy)ethyl acetoacetate (AAEM), and (Meth)acrylic acid (MAA) were combined. The oxidizer solution and reducer solution were prepared in separate vessels. The reducer solution was agitated as needed to dissolve the Bruggolite FF6.

The vessel temperature was maintained at 25° C., while a simultaneous co-feed of monomer, oxidizer and reducer solutions was provided to the vessel. The monomer solution was added over a 120 minute period. The monomer vessel was rinsed with water, and the rinse water was added into the vessel. The oxidizer and the reducer solutions were added over a 240 minute period.

The temperature of the reaction mixture increased due to the exothermic nature of the reaction. No extra measures were taken to control temperature of the reactions.

The above procedure produced a product of ketone functional polyfunctional amine (Ketone-PFA) of 30 wt. % in water, as determined by a Sartorius Mark 3 moisture analyzer.

Example 2: Preparation of Comparative PFA Polymer without Ketone Functionality A comparative PFA polymer without ketone functionality was prepared according to the following method. Table 2 provides the amounts of each component used to form an comparative PFA polymer.

TABLE 2

Reagents for Preparation of Comparative PFA Polymer

| | Material | Weight (g) | CAS |
|---|---|---|---|
| Reactor | Water | 469.3 | 7732-18-5 |
| Monomer | DMAEMA | 240.5 | 2867-47-2 |
| | Water | 5.4 | 7732-18-5 |
| Oxidizer | tBHP | 2.5 | 75-91-2 |
| | Water | 48.8 | 7732-18-5 |
| Reducer | Bruggolite FF6 | 3.6 | Mixture |
| | Water | 48.8 | 7732-18-5 |

Preparation Steps:

Water was charged to a 3 liter jacketed glass reactor. A Julabo circulator was used to circulate water through the jacket and heat the reactor to 55° C.

The monomer solution, oxidizer solution, and reducer solution were prepared in separate vessels.

The reactor was heated to a temperature of 55° C. During the heat-up, the monomer solution, the oxidizer solution, and the reducer solution were simultaneously co-fed to the reactor. The monomer solution was added over a 120 minute period. Once the monomer charge was complete, the monomer vessel was rinsed with water and the rinse water added to the reactor. The oxidizer solution and the reducer solution were added over a 240 minute period.

The above procedure produced a comparable polyfunctional amine (PFA) product of 24-27 wt. % in water, as determined by a Sartorius Mark 3 moisture analyzer.

In-situ hydrolysis of the DMAEMA gave rise to a MAA repeating unit in the polymer that resulted in a poly (DMAEMA-MAA) copolymer. This product was used as the control in the comparative coating formulation described in Example 4.

Example 3: Preparation of a Latex Resin as a Base Formulation for Water-Borne Paints A latex resin to use a base formulation for water borne paints was prepared according to the following method. Table 3 provides the amounts of each component in preparation of the latex resin.

TABLE 3

Reagents for Preparation of a typical Latex Resin base formulation

| Category | Component | Material | Weight (g) |
|---|---|---|---|
| Reactor | Reactor initial | Water | 265 |
| | | Buffer | 3.9 |
| | Reactor APS | Ammonium persulfate (APS) | 2.3 |
| | | Rinse water | 8.6 |
| | Seed | Seed Latex solution (28 wt. % in water) | 50 |
| | | Rinse water | 9.3 |
| Monomer emulsion | Monomer emulsion | Anionic surfactant | 15.3 |
| | | Water | 370 |
| | | 2-Acrylamido-2-methylpropane sulfonic acid (AMPS) solution (53 wt. % in water) | 7.7 |
| | | Methyl methacrylate (MMA) | 479.5 |
| | | Butyl acrylate (BA) | 406.2 |
| | | Acetoacetoxyethyl Methacrylate (AAEM) | 28.9 |
| | | Isooctyl 3-mercaptopropionate (IOMP) | 7.3 |
| | | (Meth)acrylic acid (MAA) | 8.7 |
| | | Rinse water | 8.6 |
| APS solutions | Initiator | APS | 0.9 |
| | | Water | 39.4 |
| | Chaser | APS | 0.5 |
| | | Water | 30.2 |
| Post addition | Ammonia solution | Ammonium hydroxide solution (30 wt. % in water) | 50 |
| | | Water | 80 |
| | Biocide | Proxel GXL | 3.6 |

Materials:

The seed latex solution was prepared as described below.

Proxel GXL biocide is commercially available from Lonza (Basel, Switzerland).

The seed latex solution was previously prepared. in a 3 liter reactor. The reactor was charged with 210.9 g of a sodium dodecyl sulfate (SDS) solution (14% of the total solution), 4.6 g of Sodium bicarbonate ($NaHCO_3$), 503.3 g of water, 158.0 g of BA, 189.5 g of MMA, 6.8 g of MAA and 16.2 g of APS. The seed solution was heated to 65° C. while the solution was agitated. The exothermic radical polymerization was controlled using 353.2 g of water that was added gradually over a period of four minutes. The seed solution was allowed to react for another 130 minutes. The latex particle size obtained was 51 nm, as determined by transmission dynamic light scattering.

Preparation Steps:

Ammonium carbonate and water were charged to a 3 liter jacketed glass reactor. A Julabo circulator was used to circulate water through the jacket and heat the reactor to 83° C.

While the reactor was heating, the reagents for the monomer emulsion were charged to a 2-liter glass vessel. The mixture was agitated to produce a stable homogeneous white emulsion.

The initiator solution was prepared by dissolving APS in a vessel containing water.

The reactor APS solution was prepared by dissolving APS in a vessel containing water.

When the ammonium carbonate solution in the reactor reached 80° C., the seed latex solution and the reactor APS solution were charged to the reactor. The charge vessels were rinsed with water and the rinse water added to the reactor to avoid material loss during the additions.

The addition of the seed latex solution and the reactor APS solution resulted in a temperature drop of the reaction mixture. The reactor was reheated to 80° C. Once the reactor was on temperature, the charge of monomer emulsion and initiator solution was started.

The monomer emulsion and initiator solution were added over a 195 minute period. Peristaltic pumps equipped with rubber tubes were used to feed monomer emulsion and initiator solutions to the reactor. The feed rate for monomer was maintained such that the feed rate (in grams/minute) of the first 30 minutes was half of the rate of the feed for the remaining 165 minutes to avoid an uncontrolled exotherm in early polymerization stage. The feed rate of the initiator solution was constant. During polymerization stage or monomer emulsion feed-in stage, the reaction temperature was maintained between 80-85° C.

Upon completion of monomer emulsion feed, the chaser solution was prepared and fed into the reactor with peristaltic pump over a period of one hour.

The reaction was cooled to below 40° C. A diluted solution of ammonium hydroxide in water was prepared and added slowly into the reactor over a period of 5 minutes. GXL biocide was added to the reactor to conclude the preparation of the latex resin.

The resulting latex resin had a pH between 10.0-10.5, average particle size of 220 nm, and solids content of 50.0%. Tg of the later polymer was in the range of 23-28° C.

Example 4: Inventive and Comparative Paint Formulations

Paint formulations were made using the Ketone-PFA from Example 1, the comparative PFA polymer of Example 2, and the latex resin of Example 3. The paint formulations were prepared according to the following method. Table 4 provides the amounts of each component used in preparation of the paint formulations. As shown in Table 4, the differences between the various paint formulations are the respective amounts of Ketone-PFA, silyl amine, or PFA polymer therein.

TABLE 4

Components of Inventive and Comparative Paint Formulations

| Material | Example Paint 1 | Example Paint 2 | Example Paint 3 | Example Paint 4 | Comparative Paint 5 | Comparative Paint 6 |
|---|---|---|---|---|---|---|
| Latex resin (g) | 455.1 | 455.1 | 455.1 | 455.1 | 455.1 | 455.1 |
| Ketone-PFA (g) | 8.2 | 7.4 | 6.2 | 4.1 | 0 | 0 |
| PFA Without Ketone Functionality (g) | 0 | 0 | 0 | 0 | 8.2 | 0 |
| Silyl amine (g) | 0 | 0.3 | 0.6 | 1.2 | 0 | 0 |
| Dispersant (g) | 6 | 6 | 6 | 6 | 6 | 6 |
| Nonionic surfactant (g) | 3 | 3 | 3 | 3 | 3 | 3 |
| Defoamer (g) | 6 | 6 | 6 | 6 | 6 | 6 |
| Viscosity modifier (g) | 0.1 | 0.1 | 0.1 | 0.1 | 0.1 | 0.1 |
| Deionized $H_2O$ (g) | 4 | 4 | 4 | 4 | 4 | 4 |
| $TiO_2$ (e) | 100 | 100 | 100 | 100 | 100 | 100 |
| $CaCO_3$ (g) | 750 | 750 | 750 | 750 | 750 | 750 |
| MeOH (g) | 30 | 30 | 30 | 30 | 30 | 30 |
| Coalescing solvent (g) | 23 | 23 | 23 | 23 | 23 | 23 |
| Float solvent (g) | 8 | 8 | 8 | 8 | 8 | 8 |

Materials: The latex resin of Example 3 was used for Example Paints 1-5. The Ketone-PFA polymer of Example 1 was used in Example Paints 1-4. The PFA polymer without ketone functionality of Example 2 was used in Comparative Paint 5.

Paint Formulation Process for Example Paints 1-4:

The Ketone-PFA was added to a quart can containing 455.1 g of the latex resin. The latex mixture was stirred for 5 minutes using a high sheer mixing blade at moderate speed. The silyl amine was added to the latex mixture dropwise while the agitation was maintained. After 5 additional minutes, the dispersant, the nonionic surfactant, and the defoamer were added while the latex mixture was stirred with a high sheer mixing blade at a moderate speed for 5 minutes. A solution of the viscosity modifier in the water was added to the latex mixture and the latex mixture was stirred at high speed for 5 minutes. Additional ammonium hydroxide (30% by weight in water) was added as needed to ensure a minimum pH of 10.0. $TiO_2$ and $CaCO_3$ were then added to the mixture while stirring at high speed for 15 minutes. After completion of the mixing and particle size of the solid materials reduced by grinding, MeOH was added slowly at a reduced stirring speed. The coalescing solvent was then added to the latex mixture with continuous stirring. Finally, the water borne floating solution was added and stirred into the latex mixture and the latex mixture was stirred for another 5 minutes until the Example Paints were complete.

Paint Formulation Process for Comparative Paint 5:

The PFA without ketone functionality of Example 2 was added to a quart can containing 455.1 g of the latex resin. The latex mixture was stirred for 5 minutes using a high sheer mixing blade at moderate speed. After 5 additional minutes, minutes, the dispersant, the nonionic surfactant, and the defoamer were added while the latex mixture was stirred with a high sheer mixing blade at a moderate speed for 5 minutes. A solution of the viscosity modifier in the water was added and the latex mixture was stirred at high speed for 5 minutes. Additional ammonium hydroxide (30% by weight in water) was added as needed to ensure a minimum pH of 10.0. $TiO_2$ and $CaCO_3$ were then added while stirring at high speed for 15 minutes. After completion of the mixing and particle size of the solid materials reduced by grinding, MeOH was added slowly at a reduced stirring speed. The coalescing solvent was then added to the latex mixture with continuous stirring. Finally, the water borne floating solution was added and stirred into the latex mixture and the latex mixture was stirred for another 5 minutes until the Comparative Paint was complete.

Paint Formulation Process for Comparative Paint 6:

A quart can containing 455.1 g of commercially available latex resin was stirred for 5 minutes using a high sheer mixing blade at moderate speed. After 5 additional minutes, the dispersant, the nonionic surfactant, and the defoamer were added while the latex was stirred with a high sheer mixing blade at a moderate speed for 5 minutes. Next, a solution of the viscosity modifier in the water was added and the latex was stirred at high speed for 5 minutes. Ammonium hydroxide (30% by weight in water) was added as needed to ensure a minimum pH of 10.0. $TiO_2$ and $CaCO_3$ were then added while stirring at high speed for 15 minutes. After completion of the mixing and particle size of the solid materials reduced, MeOH was added slowly at a reduced stirring speed. The coalescing solvent was then added to the mixture with continuous stirring. Finally, the water borne floating solution was added and stirred into the mixture and the mixture was stirred for another 5 minutes until Comparative Paint 6 was complete.

The amount of Ketone-PFA, PFA without ketone functionality, and Silyl Amine additives based on the total weight of the paint formulation, are listed in Table 5.

TABLE 5

| Amine Combination | | Example Paint 1 | Example Paint 2 | Example Paint 3 | Example Paint 4 | Comp. Paint 5 | Comp. Paint 6 |
|---|---|---|---|---|---|---|---|
| Ketone-PFA | Weight (g) | 8.2 | 7.4 | 6.2 | 4.1 | 0 | 0 |
| | Percent | 1% | 0.90% | 0.75% | 0.50% | 0% | 0% |
| PFA Without Ketone Functionality | Percent | 0% | 0% | 0% | 0% | 1% | 0% |
| Silyl amine | Weight (g) | 0 | 0.3 | 0.6 | 1.2 | 0 | 0 |
| | Percent | 0.00% | 0.12% | 0.25% | 0.5% | 0% | 0% |

Example 5: Testing of Example and Comparative Paint Formulations

The scrub resistance of the paint formulations was tested according to ASTM D2486-00. Paint made from a commercially available latex (Comparative Paint 6) was used as the control. Higher scrub resistance performance reflects longer durability when paint films were scrubbed under mechanical force.

The viscosity of the paints was tested according to ASTM D562-10 (2018). Kreb unit number or KU was been used to record the viscosity of the paints. Initial KU refers to viscosity of fresh made paints, and delta KU refers to viscosity of paints being set at 63° C. for one week. Prior to measurement using a Kreb unit viscometer, the paints were equilibrated at a 25° C. water bath for 30 minutes. Lower delta KU generally reflects better stability of paints with lower change in viscosity over the trial period.

For the scrub test, a sample of paint was drawn to 15 mil wet film thickness onto to a clean black scrub test panel and allowed to dry horizontally in a conditioned room at 23° C.±2° C. and 75% relative humidity under a constant 2 mph air flow.

For dry time, utilized to determine no tire pick-up dry time, was determined using the standard method of ASTM D711-20. A small dry time is desirable for many paint applications, including road marking applications.

TABLE 6

Testing results

| Paints | Initial KU | Delta KU | Dry time (min) | Scrub resistance % |
|---|---|---|---|---|
| Example Paint 1 | 82.5 | 12.1 | 3.5 | 120 |
| Example Paint 2 | 83.3 | 10.5 | 3.5 | 127 |
| Example Paint 3 | 83.5 | 9.1 | 3.4 | 127 |
| Example Paint 4 | 83.2 | 6 | 3.4 | 140 |
| Comparative Paint 5 | 86.4 | 20.8 | 3.3 | 108 |
| Comparative Paint 6 | 78.4 | 8 | 4.4 | 100 |

Example Paints 1-4 showed good viscosity and scrub resistance, with acceptable drying time.

The compounds and methods of the appended claims are not limited in scope by the specific compounds and methods described herein, which are intended as illustrations of a few aspects of the claims and any compounds and methods that are functionally equivalent are within the scope of this disclosure. Various modifications of the compounds and methods in addition to those shown and described herein are intended to fall within the scope of the appended claims. Further, while only certain representative compounds, methods, and aspects of these compounds and methods are specifically described, other compounds and methods are intended to fall within the scope of the appended claims. Thus, a combination of steps, elements, components, or constituents can be explicitly mentioned herein; however, all other combinations of steps, elements, components, and constituents are included, even though not explicitly stated.

EMBODIMENTS

As used below, any reference to a series of embodiments is to be understood as a reference to each of those embodiments disjunctively (e.g., "Illustrative embodiments 1-4" is to be understood as "illustrative embodiments 1, 2, 3, or 4").

Illustrative embodiment 1 is a polymer according to Formula 1:

Formula 1

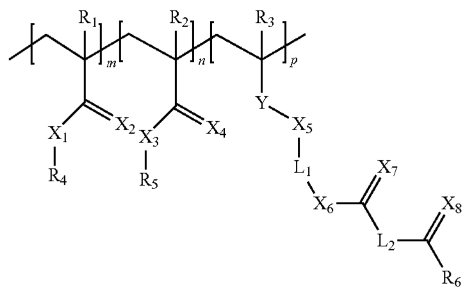

wherein each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_5$ is —H or $C_1$-$C_6$ alkyl; $R_6$ is substituted or unsubstituted $C_1$-$C_6$ alkyl; each of $X_1$, $X_3$, $X_5$, and $X_6$ is independently S, O, or N; each of $X_2$, $X_4$, $X_7$, and $X_8$ is independently S or O; Y is $CH_2$, CS, or CO; and each of $L_1$ and $L_2$ is independently substituted or unsubstituted $C_1$-$C_6$ alkyl.

Illustrative embodiment 2 is the polymer of any preceding or subsequent illustrative embodiment, wherein $R_4$ is selected from the group consisting of $—CH_2CH_2NH_2$, $—CH_2CH_2N(CH_3)_2$, and $—CH_2CH_2N(CH_2CH_3)_2$.

Illustrative embodiment 3 is the polymer of any preceding or subsequent illustrative embodiment, wherein $L_1$ and $L_2$ are independently selected from the group consisting of $—CH_2—$; $—CH_2CH_2—$; and $—CH_2CH_2CH_2—$.

Illustrative embodiment 4 is the polymer of any preceding or subsequent illustrative embodiment, wherein $L_1$ is $—CH_2CH_2—$.

Illustrative embodiment 5 is the polymer of any preceding or subsequent illustrative embodiment, wherein $R_6$ is $—CH_3$.

Illustrative embodiment 6 is the polymer of any preceding or subsequent illustrative embodiment, wherein each of $X_1$-$X_8$ is O, and wherein Y is CO.

Illustrative embodiment 7 is the polymer of any preceding or subsequent illustrative embodiment, wherein $R_1$, $R_2$, and $R_3$ are $—CH_3$.

Illustrative embodiment 8 is the polymer of any preceding or subsequent illustrative embodiment, according to Formula 1x:

Formula 1x

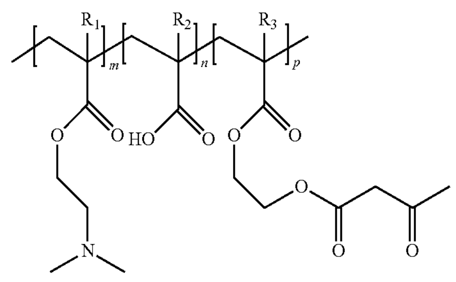

wherein each of $R_1$, $R_2$, and $R_3$ is independently —H, $—CH_3$, or $—CH_2CH_3$.

Illustrative embodiment 9 is the polymer of illustrative embodiment 8, wherein m is from 80 to 100; n is from 10 to 20; and p is from 0.5 to 2.

Illustrative embodiment 10 is the polymer of any preceding or subsequent illustrative embodiment, wherein the polymer is a random copolymer.

Illustrative embodiment 11 is a polymer formed from the formed by reacting a mixture comprising the following monomers:

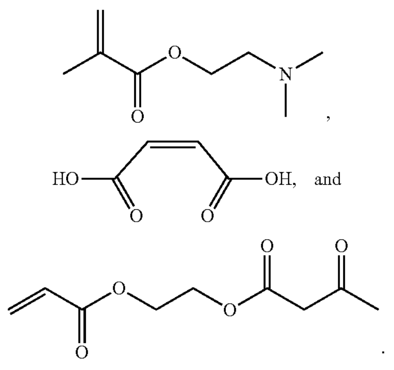

, and

Illustrative embodiment 12 is the polymer of any preceding or subsequent illustrative embodiment, wherein the mixture further comprises the following monomer:

(MAA)

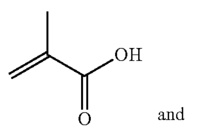

and (FA)

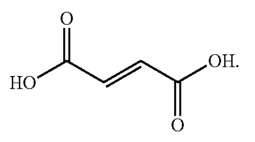

Illustrative embodiment 13 is the polymer of any preceding or subsequent illustrative embodiment, wherein the reaction is conducted at a temperature of 1° C. to 90° C.

Illustrative embodiment 14 is the polymer of any preceding or subsequent illustrative embodiment, wherein the reaction is initiated by a reducing-oxidizing pair of initiators comprising an oxidizing agent and a reducing agent.

Illustrative embodiment 15 is the polymer of any preceding or subsequent illustrative embodiment, wherein the oxidizing agent is selected from the group consisting of hydrogen peroxide, tert-butyl hydroperoxide (tBHP), ammonium persulfate (APS), sodium persulfate (SPS), and potassium persulfate (PPS), and wherein the reducing agent is selected from the group consisting of Bruggolite FF6M, Bruggolite FF7, Bruggolite E28, Bruggolite E01, Bruggolite L40, Bruggolite TP1651, ascorbic acid, sodium formaldehyde sulfoxylate (SFS), sodium bisulfite, and sodium metabisulfite (SMBS).

Illustrative embodiment 16 is a polymer according to Formula 2:

Formula 2

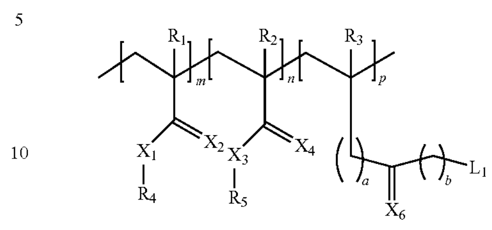

wherein each of m, n, and p is independently a number from 0.5 to 500; each of $R_1$, $R_2$, and $R_3$ is independently —H or $C_1$-$C_4$ alkyl; $R_4$ is an amine-substituted $C_1$-$C_6$ alkyl; $R_5$ is —H or $C_1$-$C_6$ alkyl; each of $X_1$ and $X_3$ is independently S, O, or N; each of $X_2$, $X_4$, and $X_6$, is independently S or O; each of a and b is independently a number from 0 to 4; and $L_1$ is —H or substituted or unsubstituted $C_1$-$C_6$ alkyl.

Illustrative embodiment 17 is a coating additive, comprising the polymer of any preceding or subsequent illustrative embodiment.

Illustrative embodiment 18 is a coating composition, comprising: the polymer of any preceding or subsequent illustrative embodiment; and an amine-containing compound.

Illustrative embodiment 19 is the coating composition of any preceding or subsequent illustrative embodiment, wherein the amine-containing compound comprises an amine-containing polymer.

Illustrative embodiment 20 is the coating composition of any preceding or subsequent illustrative embodiment, wherein the amine-containing compound comprises a silyl amine.

Illustrative embodiment 21 is the coating composition of any preceding or subsequent illustrative embodiment, wherein the silyl amine is selected from the group consisting of N-[3-(trimethoxysilyl)propyl]ethylenediamine, N1-(3-trimethoxysilylpropyl)diethylenetriamine, (3-aminopropyl)trimethoxysilane, (3-aminopropyl)triethoxysilane, 3-(ethoxydimethylsilyl)propylamine, N-[3-(trimethoxysilyl)propyl]ethylenediamine, and aminoethylaminopropyl trimethoxysilane.

Illustrative embodiment 22 is the coating composition of any preceding or subsequent illustrative embodiment, wherein the silyl amine is aminoethylaminopropyl trimethoxysilane.

Illustrative embodiment 23 is the coating composition of any preceding or subsequent illustrative embodiment, further comprising a latex that is anionically stabilized.

Illustrative embodiment 24 is the coating composition of any preceding or subsequent illustrative embodiment, wherein the polymer is present in the coating composition in an amount of 0.01-2 wt. %, based on a dry weight of the composition.

Illustrative embodiment 25 is the coating composition of any preceding or subsequent illustrative embodiment, wherein the amine-containing compound is present in the coating composition in an amount of 0.01-2 wt %, based on a dry weight of the composition.

Illustrative embodiment 26 is a paint comprising: the polymer of any preceding or illustrative embodiment; and an amine-containing compound.

Whereas particular examples of this invention have been described above for purposes of illustration, it will be evident to those skilled in the art that numerous variations of the details of the present invention may be made without departing from the invention as defined in the appended claims.

That which is claimed:

1. A polymer mixture comprising a polymer according to Formula 1x:

Formula 1x

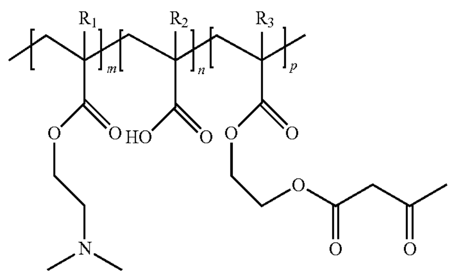

wherein m, n and p are integers;

m is from 80 to 100; n is from 10 to 20; and p is from 1 to 4; and each of $R_1$, $R_2$, and $R_3$ is independently —H, —$CH_3$, or —$CH_2CH_3$.

2. A coating additive, comprising the polymer mixture of claim 1.

3. A coating composition, comprising:

the polymer mixture of claim 1 and an amine-containing compound.

4. The coating composition of claim 3, wherein the amine-containing compound comprises a silyl amine.

5. The coating composition of claim 4, wherein the silyl amine is selected from the group consisting of N-[3-(trimethoxysilyl)propyl]ethylenediamine, N1-(3-trimethoxysilylpropyl)diethylenetriamine, (3-aminopropyl)trimethoxysilane, (3-aminopropyl)triethoxysilane, 3-(ethoxydimethylsilyl)propylamine, N-[3-(trimethoxysilyl)propyl]ethylenediamine, and aminoethylaminopropyl trimethoxysilane.

6. The coating composition of claim 3, further comprising an anionically stabilized latex.

7. The coating composition of claim 3, wherein the polymer mixture is present in the coating composition in an amount of 0.01-2 wt. %, based on a dry weight of the composition.

8. The coating composition of claim 3, wherein the amine-containing compound is present in the coating composition in an amount of 0.01-2 wt %, based on the dry weight of the composition.

9. The coating composition of claim 3, wherein the coating is applied to a roadway.

10. A paint comprising:

the polymer mixture of claim 1;

an amine-containing compound; and at least one of titanium dioxide and calcium carbonate.

11. A waterborne paint comprising:

the polymer mixture of claim 1; and a latex resin.

12. The waterborne paint of claim 11, further comprising a silyl amine.

13. The waterborne paint of claim 11, further comprising a dispersant, nonionic surfactant, defoamer, viscosity modifier, coalescing solvent, float solvent, or combination thereof.

14. The waterborne paint of claim 11, wherein the waterborne paint is applied to a roadway.

* * * * *